Oct. 8, 1957 C. HARRIS Re. 24,370

EMBROIDERING MECHANISM FOR ZIGZAG SEWING MACHINES

Original Filed June 9, 1952 4 Sheets-Sheet 1

INVENTOR.
Carl Harris
BY Alex. E. MacRae
Attorney.

EMBROIDERING MECHANISM FOR ZIGZAG SEWING MACHINES

Original Filed June 9, 1952 4 Sheets-Sheet 2

INVENTOR.
Carl Harris
BY
Alex. R. Macdae
Attorney.

EMBROIDERING MECHANISM FOR ZIGZAG SEWING MACHINES

Original Filed June 9, 1952 4 Sheets-Sheet 3

INVENTOR.
Carl Harris
BY
Alex. C. MacRae
Attorney.

EMBROIDERING MECHANISM FOR ZIGZAG SEWING MACHINES

Original Filed June 9, 1952 4 Sheets-Sheet 4

INVENTOR.
Carl Harris
BY Alex. G. MacRae
Attorney.

United States Patent Office

Re. 24,370
Reissued Oct. 8, 1957

24,370

EMBROIDERING MECHANISM FOR ZIGZAG SEWING MACHINES

Carl Harris, Montreal, Quebec, Canada, assignor to The Singer Manufacturing Company, Elizabethport, N. J.

Original No. 2,693,778, dated November 9, 1954, Serial No. 292,468, June 9, 1952. Application for reissue June 16, 1955, Serial No. 516,058

7 Claims. (Cl. 112—158)

Matter enclosed in heavy brackets [ ] appears in the original patent but forms no part of this reissue specification; matter printed in italics indicates the additions made by reissue.

This invention relates to sewing machines and more particularly to an embroidering mechanism for sewing machines of the zigzag type.

Zigzag sewing machines are well known in the art and many attachments for such machines have been heretofore proposed to simplify and augment the production thereby of ornamental designs and stitches. In general, however, such attachments require skilled attention on the part of the operator and they are subject to a very limited range of designs.

An object of the present invention is to provide an embroidering mechanism for zigzag sewing machines which is simple and inexpensive to manufacture, which may be readily mounted on existing machines, which is capable of producing a very wide variety of designs with minor and convenient adjustment of the mechanism, and which substantially reduces the skilled attention required by the operator.

Figure 1:
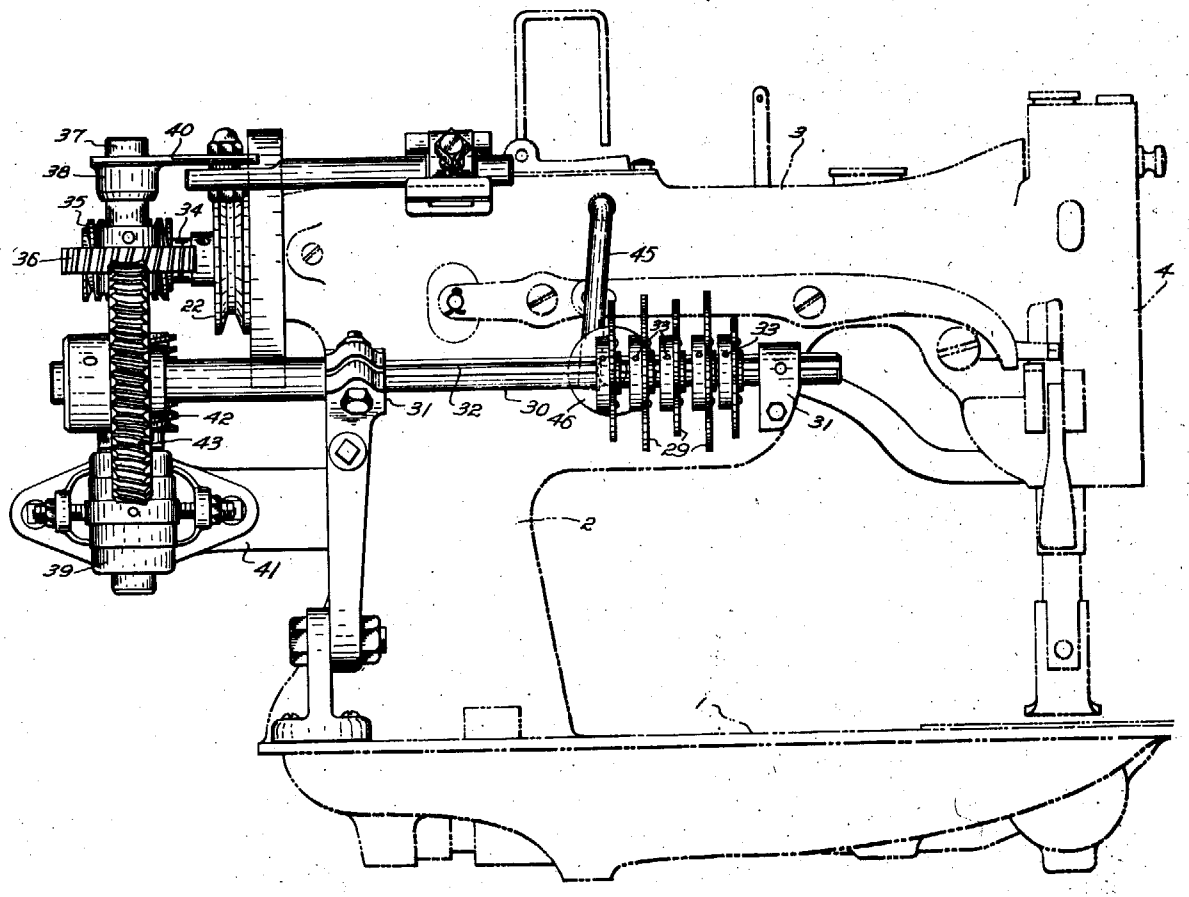
Figure 2:
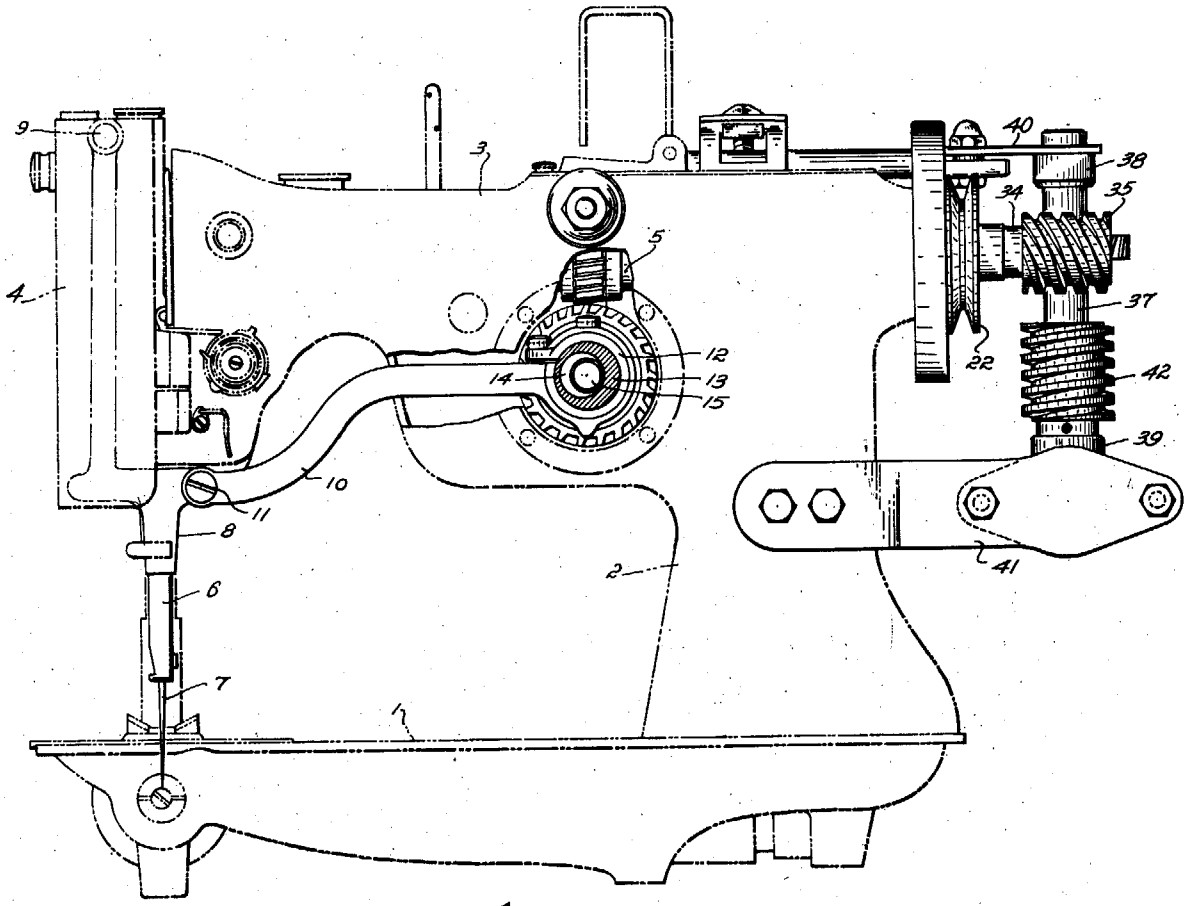
Figure 3:
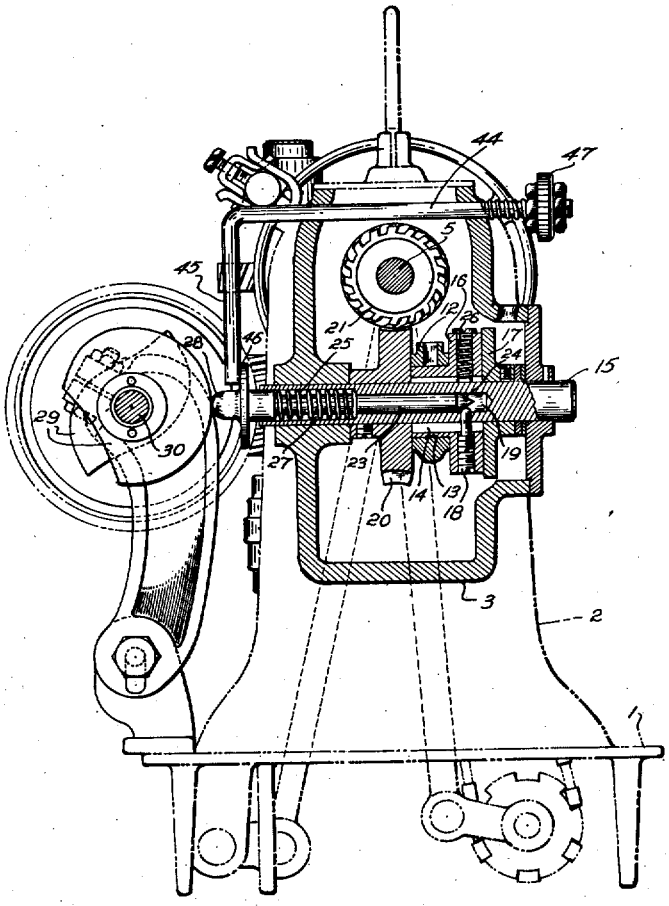
Figure 6:
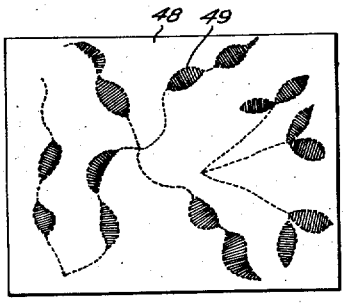
Figure 4:
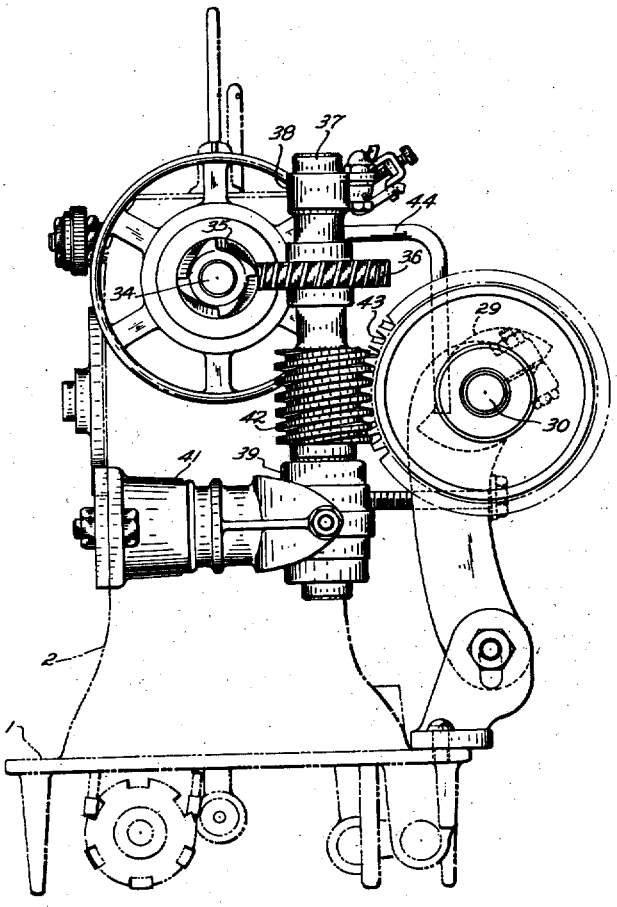
Figure 5:
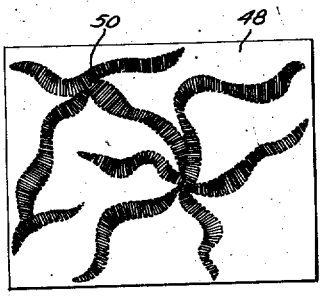

The invention will be described with reference to the accompanying drawing in which:

Figure 1 is a side elevation of a machine embodying the mechanism of the present invention, Figure 2 is an elevation of the other side of the machine, Figure 3 is an end elevation, partly in section, Figure 4 is an end elevation, Figure 5 is a plan view of one form of design applied to a fabric, and Figure 6 is a plan view of another form of design.

The sewing machine illustrated is of the usual zigzag type and comprises conventional elements including a main frame having a work-supporting bed-plate 1, on one end of which is mounted the tubular standard 2 having an arm 3 overhanging the bed-plate 1. The head 4 is carried by the free end of the arm 3. The needle-reciprocating shaft 5 is journalled in the arm 3 and extends longitudinally thereof. A needle bar 6 carrying a needle 7 is mounted in the head 4 and is connected to the shaft 5 for reciprocation thereby by usual means, not shown. The needle-bar 6 is journalled in a frame 8 which is pivotally mounted on pin 9 in head 4 for lateral swinging movement. Such movement is imparted to the frame 8 and needle-bar 6 by means of a pitman 10 pivoted at one end by screw 11 to frame 8. A split ring 12 mounted on the other end of the pitman embraces an eccentric 13. The eccentric 13 has an enlarged opening 14 therein to receive a transverse shaft 15 journalled in the walls of arm 3. The eccentric 13 is carried by a frame 16 which is adjustably mounted on a disc 17 fixed to the shaft 15. A pin 18 mounted in frame 16 has a rounded end portion extending into an axial bore 19 in shaft 15 and it will be appreciated that adjustment of the frame 16 and consequent adjustment of the eccentricity of eccentric 13 is effected by reciprocation of the pin 18, all in the conventional manner.

The shaft 15 is driven from shaft 5 by means of a gear wheel 20 fixed thereto and a worm gear 21 on shaft 5. Shaft 5 is driven in the usual manner by belt pulley 22 mounted on one end thereof.

In accordance with the invention, means are provided for automatically varying the eccentricity of the eccentric 11 in accordance with a fixed preselected pattern and such means, as shown, comprises a spindle 23 reciprocally mounted in bore 19 and having a conical end portion 24 in engagement with pin 18. Spindle 23 acts upon pin 18 in the same manner as the conventional manually-actuated regulating spindle and moves in one direction to reciprocate the pin 18 outwardly and in the reverse direction to permit the pin 18 to reciprocate inwardly under the influence of the biasing spring 26 in frame 16. However, spindle 23 of the present invention is spring-biased in such reverse direction by means of a spring 25 on the spindle, such spring being located in an enlarged diameter portion 27 of bore 19. Spindle 23 has a rounded head 28 located exteriorly of the arm 3 on the rearward side of the machine.

Means for automatically reciprocating spindle 23 comprises a selected one of a series of cams 29 mounted on shaft 30 journalled in an auxiliary frame which includes bearings 31 suitably supported in a fixed relation on the main frame of the machine. The cams 29 are keyed to the shaft for longitudinal adjustment therealong by means of the keyway 32 and may be locked in desired position on the shaft by set screws 33 or the like. Each cam 29 comprises a plate of predetermined shape, the edge of which constitutes the cam surface. In operation, a preselected one of said cams is locked in position on the shaft 30 with its edge in engagement with *a cam follower in the form of* the rounded end of spindle 23, which is urged against the cam surface by the spring 25. It will be observed that, on rotation of the cam, the spindle 23 will be subjected to a succession of cycles of reciprocating movements of desired amplitude depending upon the shape of the cam. As will follow from the foregoing description, such movements will result in corresponding variations in the eccentricity of the eccentric 13.

Means for driving the cam shaft 30 at a suitable speed comprises a shaft extension 34 on the end of shaft 5, a worm gear 35 fixed to shaft extension 34, a gear wheel 36 meshing with gear 35 and fixed to a vertically disposed shaft 37 mounted in bearings 38 and 39 carried by bearing brackets 40 and 41 mounted on the standard 2, a worm gear 42 fixed to shaft 37, and a gear wheel 43 fixed to shaft 30. It will be apparent that the ratio of gears 35, 36, 42 and 43 may be chosen to provide a desired speed of rotation of cam shaft 30. It will be apparent that cam shaft 30 must rotate very slowly and at a very much lower speed than that of shaft 5. While this speed ratio may vary considerably, a satisfactory ratio is one which will result in one revolution of a cam 29 for each 450 reciprocations of the needle, i. e., for each 450 penetrations of the material by the needle. This ratio may, however, vary from 250 to 750 reciprocations to one cam revolution depending upon the shape and length of design desired. The gear 43 shown has 38 teeth and a diameter of 3½ inches. The number of teeth on gear 43 may of course vary considerably and a range of 24–60 teeth may be mentioned by way of example. The gear 36 shown has 19 teeth and a diameter of 1¾ inches. The number of teeth on gear 36 may likewise vary considerably and a range of 15–19 teeth is mentioned by way of example.

Means may be provided for holding spindle 23 out of cam-engaging position during positioning of the selected cam for operating movement. This means may comprise a rod 44 reciprocatingly mounted in arm 3 and having a depending end portion 45 for engagement with an annular shoulder 46 on spindle 23. *An operator-influenced* knob 47 on the other end of rod 44 is provided for imparting reciprocating movement to the rod.

The machine is provided with the usual loop-taker and feed dog mechanism, not shown.

In operation, the lines or paths along which an ornamental design is desired to be formed are marked on a piece of fabric as indicated at 48. Thereafter, the operator, having selected a cam corresponding to a desired pattern and locked it in operating position, operates the machine in the usual manner while, however, merely guiding the work along the indicated lines. The automatic variations in the eccentricity of the eccentric 13 will cause the formation of embroidered designs as indicated, design 49 in Figure 6 being produced by the action of one cam and design 50 in Figure 7 being produced by the action of another cam. Thus, no special skill is required on the part of the operator in the formation of the designs.

Various changes may be made in the structure described without departing from the spirit of the invention as defined in the appended claims. For instance, the cams 29 and camshaft 30 may be mounted on the front of the machine instead of on the back, as shown. In the latter event, the shaft 15, spindle 23, and associated parts will be mounted in reverse position in arm 3. As will be apparent from Figure 3, such reverse mounting will permit use of a shorter spindle 23.

What is claimed is:

1. In combination with a sewing machine having a main frame, a needle bar, a driven needle bar-reciprocating shaft, a rotary needle bar-vibrating eccentric, and a spindle reciprocally mounted in the frame for adjusting the eccentricity of said eccentric, an embroidering mechanism comprising an auxiliary frame mounted on the main frame, a shaft mounted in the auxiliary frame in substantially right angular relation to said spindle, a cam mounted on said shaft and having a cam edge surface, said spindle having a free end projecting laterally of said main frame, said free end being engageable with said cam surface, a spring engaging said spindle and urging it into engagement with said cam surface, and a chain of gears mounted in said auxiliary frame and positively and constantly drivably connecting said needle bar-reciprocating shaft and said cam shaft to drive said cam shaft in response to every rotative movement of said needle-bar reciprocating shaft, said spindle being thereby subject to substantially constant reciprocating movement in response to all rotative movement of said needle bar-reciprocating shaft.

2. An embroidering mechanism as defined in claim 1, said chain of gears comprising a speed reduction gear means driving said cam shaft at a ratio of one revolution of said cam to at least 250 reciprocations of said needle bar.

3. An embroidering mechanism as defined in claim 1, said needle bar-reciprocating shaft having an extension on one end thereof, said chain of gears comprising a worm gear fixed to said extension and drivable with said needle bar-reciprocating shaft, a shaft mounted in said auxiliary frame in right angular relation to said needle bar-reciprocating shaft, a gear on said right angular shaft meshing with said worm gear, a worm gear fixed to said right angular shaft, and a gear on said cam shaft meshing with said second worm gear, said second gear being of greater diameter than said first gear.

4. In combination with a sewing machine having a main frame, a needle bar, a driven needle bar-reciprocating shaft, a rotary needle bar-vibrating eccentric, and a spindle reciprocally mounted in the frame for adjusting the eccentricity of said eccentric, an embroidering mechanism comprising a spring engaging said spindle and urging the latter laterally outwardly from said frame, said spindle having a free end projecting laterally of said frame, an auxiliary frame mounted on the main frame, a shaft journalled in said auxiliary frame in right angular relation to said spindle, a cam fixed to said last-mentioned shaft and having a cam edge surface engaging said free end of the spindle, and gear means in positive and constant driving connection with said last-mentioned shaft and said needle-bar reciprocating shaft to drive said cam continuously during all rotative movements of said needle-bar reciprocating shaft thereby to impart substantially constant reciprocating movement to said spindle.

5. *An ornamental stitch sewing machine for selectively producing a plurality of different stitch patterns and comprising, a hollow frame, a needle pivotally carried by said frame and mounted for endwise reciprocation and for lateral swinging movements, a rotary shaft mounted in said frame for reciprocating said needle, means for rotating said shaft, a series of rotary cams having different stitch patterns carried by said frame mounted for rotation about a common axis and shiftable lengthwise of said axis, means connected with said shaft for rotating said cams about said common axis, a cam follower, means mounting said cam follower in said frame for movement radially of said common axis, said follower having a single cam-engaging head with its one end engaging and responding to the surface of a cam of said series, means enabling a selected cam to be engaged by said single cam-engaging head, spring means normally urging said single cam-engaging head into engagement with said selected cam surface, means releasably locking said cam-engaging head and said selected cam surface against movement relative to each other lengthwise of said common cam axis during the normal operation of the machine, a manually operable member carried within said frame and having a portion positioned adjacent to and movable with said cam follower for withdrawing said cam-engaging head from and radially of said selected cam surface, a handle formed on said member and extending outside the confines of said frame, means enabling a selected cam of said series to be shifted lengthwise of said common axis and disposed in operative engagement with said single cam-engaging head after said cam follower has been withdrawn radially from a selected cam thereby to effect a partial or a complete traverse of said series of rotary cams whereby the single cam-engaging head can be manually engaged with one cam after the other in any desired sequence, and a pitman having one end connected with said needle at a point spaced from the pivot and its other end operatively connected with the other end of said single cam-engaging head thereby to impart lateral swinging movement to said needle in response to the surface of said selected cam.*

6. *An ornamental stitch sewing machine for selectively producing a plurality of different stitch patterns and comprising, a hollow frame, a needle pivotally carried by said frame and mounted for endwise reciprocation and for lateral swinging movements, a rotary shaft mounted in said frame for reciprocating said needle, means for rotating said shaft, means including a constantly rotatable eccentric for imparting swinging movements to said needle driven by said rotating means, a series of rotary cams having different stitch patterns carried by said frame and mounted about a common axis, means connected with said shaft for rotating said cams about said common axis, a cam follower, means mounting said cam follower in said frame for movement radially of said common axis, said follower having a single cam-engaging head with its one end engaging and responding to the surface of a cam of said series, means enabling a selected cam to be engaged by said single cam-engaging head, spring means normally urging said single cam-engaging head into engagement with said selected cam surface, means releasably locking said cam-engaging head and said selected cam surface against movement relative to each other lengthwise of said common cam axis during the normal operation of the machine, a manually operable member carried within said frame and having a portion*

*positioned adjacent to and movable with said cam follower for withdrawing said cam-engaging head from and radially of said selected cam surface, a handle formed on said member and extending outside the confines of said frame, said series of cams and said single cam-engaging head being relatively shiftable lengthwise of the common cam axis after said cam follower has been withdrawn radially from a selected cam thereby to effect a partial or a complete traverse of said series of rotary cams whereby the single cam-engaging head can be manually engaged with one cam after the other in any desired sequence, and means operatively connecting the other end of said cam-engaging head with said needle swinging means whereby the patterns of lateral swinging movements imparted to said needle by said rotating eccentric are automatically varied.*

*7. An ornamental stitch sewing machine for selectively producing a plurality of different stitch patterns and comprising a hollow frame, a needle pivotally carried by the frame and mounted for endwise reciprocation and for lateral swinging movements, a first rotary shaft mounted horizontally in the frame for reciprocating the needle, means for rotating the shaft, a second shaft carried vertically by the frame, gears connecting the first and second shafts whereby the second is driven by the first, a third shaft carried by the frame in parallelism with and at a location below the first shaft, gears connecting the second and third shafts whereby the third is driven by the second, a series of rotary cams having different stitch patterns carried by and rotatable with the third shaft, a cam follower, means mounting the cam follower in the frame at a location beneath the first shaft for movement radially of the third shaft, said follower having a single cam-engaging head with its one end engaging and responding to the surface of a cam of the series, means enabling a selected cam to be engaged by the single cam-engaging head, spring means normally urging the single cam-engaging head into engagement with the selected cam surface, means releasably locking said cam-engaging head and said selected cam surface against movement relative*

*to each other lengthwise of the third shaft during the normal operation of the machine, manually operable means disposed adjacent to and movable with the cam follower for withdrawing the cam-engaging head from and radially of a selected cam surface, said last mentioned means including a horizontal rod reciprocatingly mounted in the frame with a portion thereof extending outside the confines of the frame and with a knob provided upon the exposed end of the rod for imparting reciprocating movements thereto, said series of cams and said single cam-engaging head being relatively shiftable lengthwise of the third shaft after the cam follower has been withdrawn radially from a selected cam thereby to effect a partial or a complete traverse of the series of rotary cams whereby the single cam-engaging head can be manually engaged with one cam after the other in any desired sequence, and a pitman having one end connected with the needle at a point spaced from the pivot and its other end operatively connected with the other end of the single cam-engaging head thereby to impart lateral swinging movement to the needle in response to the surface of the selected cam.*

References Cited in the file of this patent or the original patent

UNITED STATES PATENTS

| | | |
|---|---|---|
| 1,020,089 | Gray | Mar. 12, 1912 |
| 1,033,721 | Miller | July 23, 1912 |
| 1,105,354 | Laula | July 28, 1914 |
| 1,551,453 | Aronson et al. | Aug. 25, 1925 |
| 2,005,070 | Bitzer | June 18, 1935 |
| 2,005,673 | Eames | June 18, 1935 |
| 2,089,551 | Hand | Aug. 10, 1937 |
| 2,377,777 | Hale | June 5, 1945 |
| 2,500,211 | Sigoda | Mar. 14, 1950 |
| 2,517,079 | Birdsall | Aug. 1, 1950 |
| 2,682,845 | Casas Robert et al. | July 6, 1954 |

FOREIGN PATENTS

| | | |
|---|---|---|
| 19,184 | Great Britain | 1908 |